United States Patent
Ghassemzadeh et al.

(10) Patent No.: US 8,509,723 B2
(45) Date of Patent: Aug. 13, 2013

(54) MULTI-ANTENNA/MULTI-RECEIVER ARRAY DIVERSITY SYSTEM

(75) Inventors: Saeed S. Ghassemzadeh, Andover, NJ (US); Richard Henry Erving, Piscataway, NJ (US); Robert Raymond Miller, II, Convent Station, NJ (US); Christopher W. Rice, Parsippany, NJ (US)

(73) Assignee: AT&T Intellectual Property II, LP, Atlanta, GA (US)

( * ) Notice: Subject to any disclaimer, the term of this patent is extended or adjusted under 35 U.S.C. 154(b) by 0 days.

(21) Appl. No.: 12/313,897

(22) Filed: Nov. 25, 2008

(65) Prior Publication Data

US 2009/0075618 A1  Mar. 19, 2009

Related U.S. Application Data

(60) Continuation of application No. 11/226,827, filed on Sep. 14, 2005, now Pat. No. 7,457,602, which is a division of application No. 09/962,994, filed on Sep. 25, 2001, now Pat. No. 7,155,192.

(51) Int. Cl.
*H04B 1/06* (2006.01)

(52) U.S. Cl.
USPC ............... 455/272; 455/276.1; 455/277.2

(58) Field of Classification Search
USPC ............................................ 455/272
See application file for complete search history.

(56) References Cited

U.S. PATENT DOCUMENTS

| | | | |
|---|---|---|---|
| 4,733,402 A | 3/1988 | Monsen | |
| 5,159,707 A * | 10/1992 | Mogi et al. | 455/134 |
| 5,898,741 A | 4/1999 | Nagashima | |
| 6,314,305 B1 | 11/2001 | Solondz et al. | |
| 6,622,013 B1 * | 9/2003 | Miyoshi et al. | 455/277.2 |
| 6,664,921 B2 | 12/2003 | Pratt | |
| 6,925,293 B2 * | 8/2005 | Lindenmeier et al. | 455/276.1 |
| 7,155,192 B2 | 12/2006 | Ghassemzadeh et al. | |
| 7,457,602 B2 | 11/2008 | Ghassemzadeh et al. | |
| 2002/0160737 A1 | 10/2002 | Crawford | |
| 2003/0002471 A1 * | 1/2003 | Crawford et al. | 370/343 |

FOREIGN PATENT DOCUMENTS

| | | |
|---|---|---|
| EP | 0709974 A1 | 1/1996 |
| EP | 1045531 A1 | 10/2000 |
| WO | 9728615 A1 | 8/1997 |

OTHER PUBLICATIONS

Kong, Nign and Milstein, Laurence B., "Average SNR of a Generalized Diversity Selection Combining Scheme," IEEE Communications Letters, Mar. 1999, vol. 3, No. 3, pp. 57-59.

* cited by examiner

*Primary Examiner* — Ajibola Akinyemi
(74) *Attorney, Agent, or Firm* — Abel Law Group, LLP

(57) ABSTRACT

The present invention is a system for increasing Signal-to-Noise Ratio (SNR) in a wireless communication system comprising a plurality of antennas each antenna providing a signal, a device for selecting a subset of signals provided by the plurality of antennas, a maximum ratio combiner for summing the selected subset of signals provided by the plurality of antennas, and a decision device for measuring the selected subset of signals against a predefined threshold. The device for selecting the subset of signals is coupled to the plurality of antennas. The maximum ratio combiner is coupled to the selected subset of signals and the decision device for measuring the selected subset of signals against a predefined threshold. The decision device is coupled to the selecting device such that one selected signal of the selected subset of signals is replaced by an unused signal provided by the plurality of antennas.

18 Claims, 5 Drawing Sheets

Block Diagram of Invention

Figure 1: Block Diagram of Invention

Figure 2: State Diagram of Invention

MULTI-ANTENNA/MULTI-RECEIVER ARRAY DIVERSITY SYSTEM

RELATED APPLICATION

This application is a continuation of application Ser. No. 11/226,827, filed Sep. 14, 2005, now U.S. Pat. No. 7,457,602; which is a Divisional application of U.S. patent application Ser. No. 09/962,994, filed Sep. 25, 2001, now U.S. Pat. No. 7,155,192.

FIELD OF THE INVENTION

The invention relates to multiple-antenna and multiple-receiver arrays for use in increasing Signal-to-Noise Ratio (SNR) at the receiver. In particular, the present invention uses polarization and spatial diversity to improve the SNR at the receiver.

BACKGROUND OF THE INVENTION

In wired or fiber systems, there is primarily only one signal path which provides a clean, non-interfering channel through which the signal propagates. In wireless communication systems, signal propagation is mainly by way of scattering from the surfaces of buildings, cars, trees, walls and furniture and by diffraction over and/or around these objects, causing the transmitted signal to arrive at the receiver via multiple paths through the air. The collection of propagation paths traversed by the signals from the transmitter to the receiver is called the channel. Due to the multipath effect, signals may arrive in-phase or out-of-phase with one another and at varying amplitude levels. To further complicate matters, as the physical objects within the channel move (i.e. the receiver, transmitter or objects in the path between the transmitter and receiver), the channel changes. This provides a time-varying component to almost all wireless channels. The effect of this time-varying channel is a time-varying received signal amplitude and phase at the receiver. Without using techniques to compensate for this variation, extra signal-to-noise margin must be maintained at the receiver to ensure reliable communications.

Diversity is one technique used to combat time-varying channel effects. Diversity may be used in any combination within the time, frequency, polarization, or spatial domains. Simple diversity techniques can provide tremendous improvements in the signal level at the receiver.

The key, as in any technique, is to provide the maximum benefit for the minimum penalty (size, cost, etc.).

SUMMARY OF THE INVENTION

The multi-antenna/multi-receiver switch array diversity system of the present invention uses spatial and polarization diversity to improve performance at the receiver. Four antennas at the receiver provide four unique (uncorrelated or low-correlation) versions of the signal at their terminals. Positions 1 and 2 (providing spatial diversity) each have two antennas in cross-polarization (A&B) to one another. The cross-polarization provides polarization diversity. Thus, the four antennas are both polarization and spatially diverse. This provides polarization diversity for each spatially diverse position.

The present invention takes advantage of a blind switching scheme based on a predefined threshold and algorithm to combine dually polarized and/or multiple antennas to increase SNR at the receiver. The increase in the SNR may be used to decrease the Bit Error Rate (BER), increase the overall Quality of Service (QoS) or reduce transmit power requirements for narrowband or wideband communication systems operating in wireless environments.

The switched antenna array concept of the present invention seeks to optimize the tradeoff between the benefit from diversity implementation and penalty in terms of size and cost to implement. The novelty of the present invention centers around the combined use of spatial and polarization diversity.

It is, therefore, an object of the present invention to use polarization and spatial diversity to increase SNR at the receiver.

It is another object of the present invention to use a blind switching algorithm to increase SNR at the receiver.

BRIEF DESCRIPTION OF THE DRAWINGS

The invention is best described with reference to the detailed description and the following figures, where.

DETAILED DESCRIPTION OF THE PREFERRED EMBODIMENTS

In the present invention, four antennas at the receiver provide four unique (uncorrelated) versions of the signal at their terminals. Positions 1 and 2 (providing spatial diversity) each have two antennas in cross-polarization to one another, thus providing polarization diversity. Having four antennas that are both polarization and spatially diverse provides polarization diversity for each spatially diverse position.

One option at this point would be to maximally combine the signals at all four of the antennas into the receiver. Each signal would require its own receiver chain, making this a costly option. In addition, simulations and field results show that one or two signals dominate the contribution at the receiver. The two highest signals are chosen from the four available signals.

Preferably, an algorithm is used that combines any two of these into a maximal ratio combining receiver. The advantage of this approach is twofold:

1. Only one spatial distance is required to provide diversity (typically one wavelength) between spatially diverse antennas at position 1 and position 2. With the spatial separation between positions 1 and 2, each antenna is unique (diverse) from the remaining three and only one wavelength physical separation was required to do this.
2. By using the two highest signals, most of the benefit from the four input case of maximal combination could be obtained for half the receiver cost.

Figure 1:
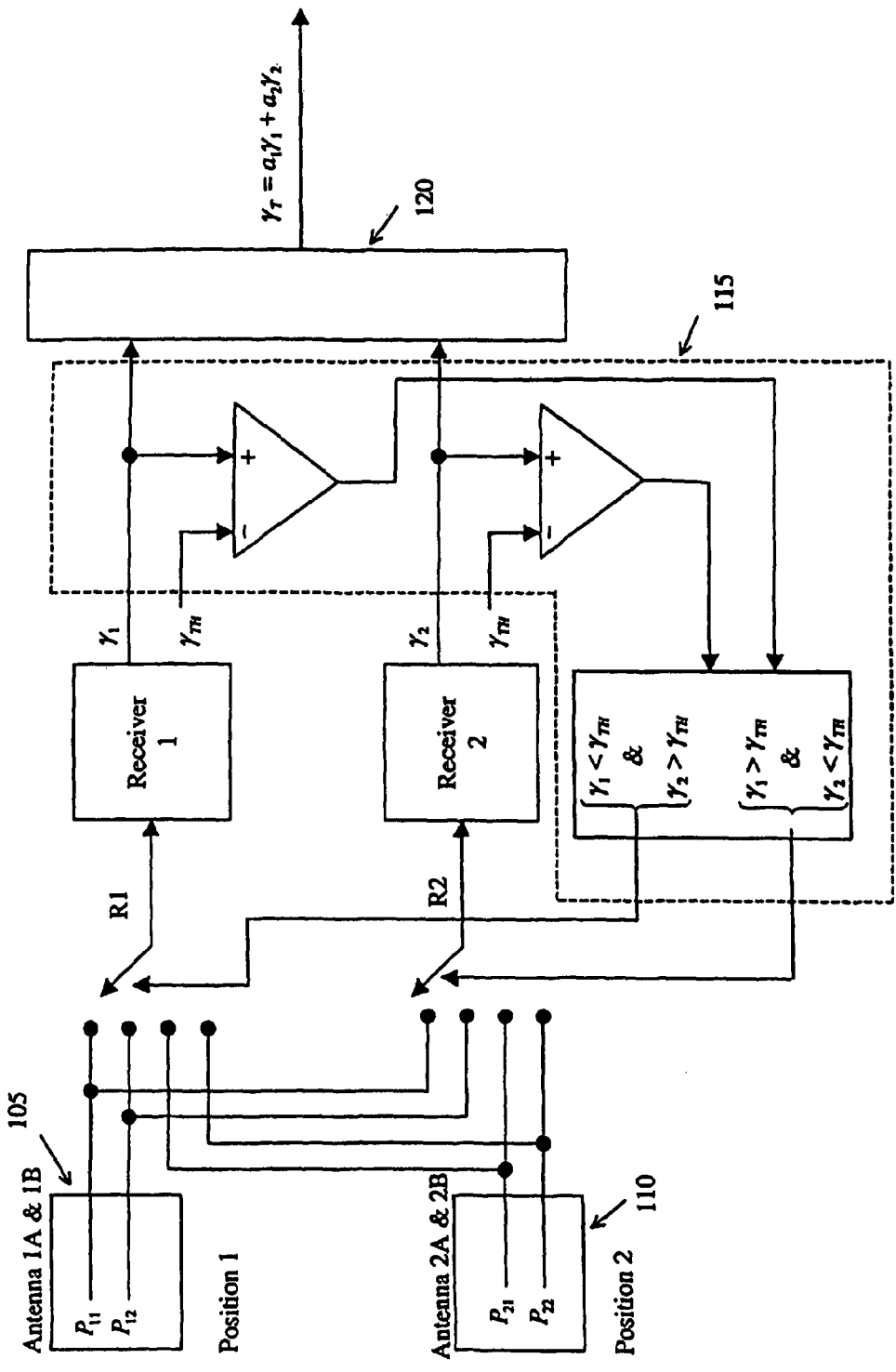
FIG. 1 is a block diagram of the switched array diversity system.

FIG. 1 is a block diagram of the switched antenna array diversity system concept. Four input signals $P_{11}$, $P_{12}$, $P_{21}$ and $P_{22}$ are present with $P_{11}$ representing antenna position 1 with polarization A, $P_{12}$ representing antenna position 1 with polarization B, $P_{21}$ representing antenna position 2 and polarization A and $P_{22}$ representing antenna position 2 and polarization B. Switch-1 105 and switch-2 110 each choose from among the four signals. Each switch 105 and 110 selects the highest signal but the switches are prevented from selecting the same signal and do not switch at the same time. From the four input signals present, two ($R_1$ and $R_2$) are chosen and maximally combined using a maximum ratio combiner 120 to provide a composite signal. As shown, any two of the signals (represented by $\gamma_1$ and $\gamma_2$) may be combined with one another. Each of the signals may be adjusted by a coefficient, e.g., $\alpha_1$ and $\alpha_2$. The two selected signals ($R_1$ and $R_2$) are inspected in the "decision block" 115 and if one of the signals drops below a predefined threshold, one of the unused signals is chosen and combined. The decision process for choosing the best signal inputs is continual.

The present invention chooses the two largest or highest antenna inputs from a choice of four available input signals and combines them in a maximal-ratio combiner 120 to produce an output of higher value and greater consistency than in two-input diversity systems. Additionally, signal $\gamma_1$ may be adjusted by coefficient $\alpha_1$ and signal $\gamma_2$ may be adjusted by coefficient $\alpha_2$. The algorithm of the present invention continually inspects each input in the "decision block" 115 and compares it to a pre-defined threshold value. Should the value at an input drop below the threshold value, the algorithm chooses another input.

Figure 2:
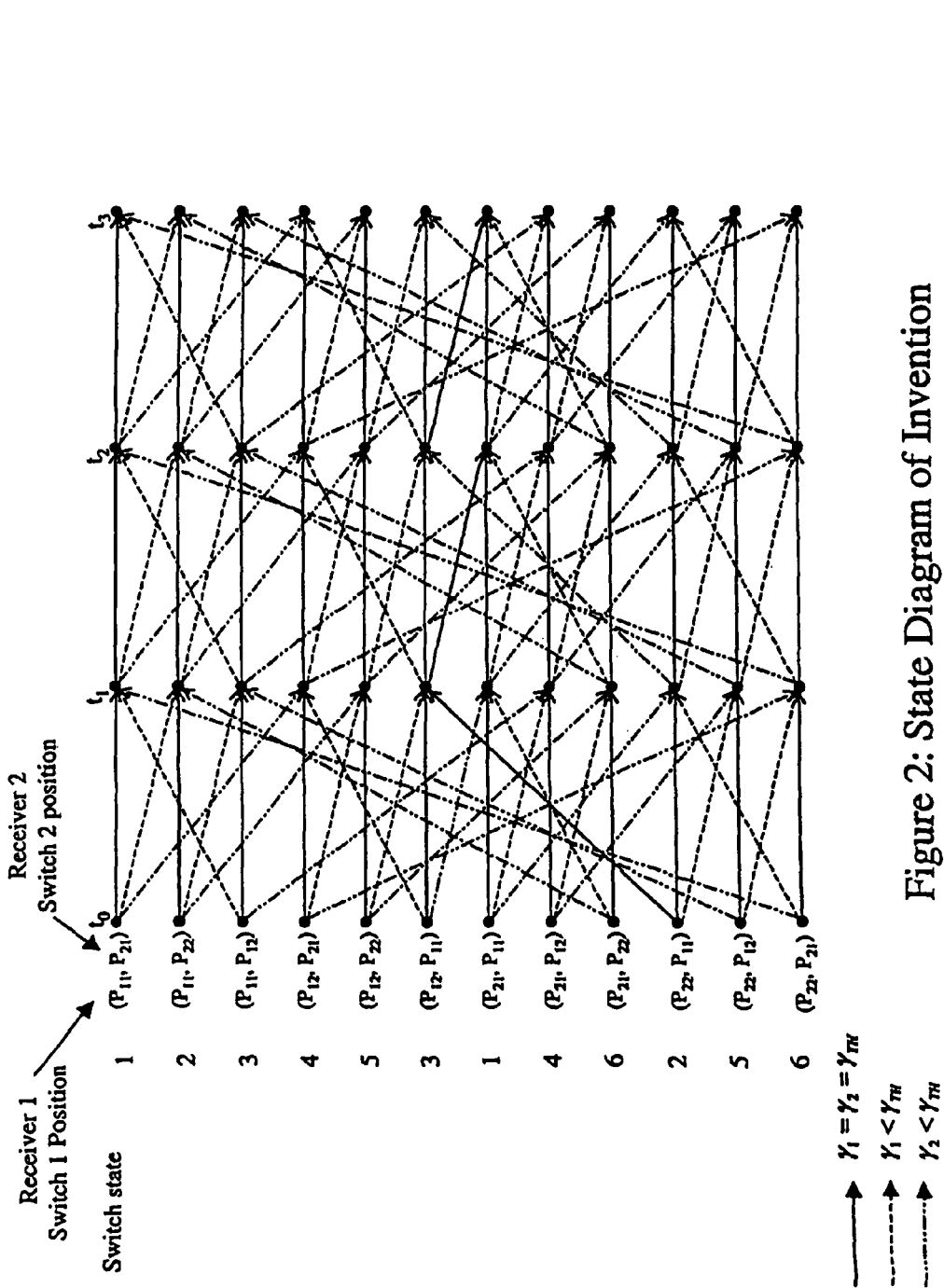
FIG. 2 is a state diagram of the switch diversity array concept.

FIG. 2 is a state diagram of the switch diversity array concept and provides the algorithm for switching between states. Notice that only one antenna is switched at a given time; this ensures that no transients are present at the output, which would interrupt the signal communication flow. While the algorithm is blind (no information ahead of time), it provides benefit since statistically there is only a small likelihood that two signals will be in a fade (at a low level) at the same time.

The algorithm for deciding if one of the two selected input signals has fallen below a pre-defined threshold, thereby requiring selection of another input signal, is as follows. The antennas are ranked with the rank being defined by antenna number. Antenna numbers can be assigned in any reasonable manner. When the metric on one of the antennas falls below the pre-defined threshold, a switch is made to the available antenna of the next highest rank. The leftmost column indicates switch state. The next column to the right indicates the possible antenna pair combinations. If the highest rank antenna is to be switched, then its rank is re-assigned the rank of 0 before the algorithm is applied. The available antenna set is defined as the set $\{(P_{11}, P_{12}), (P_{11}, P_{21}), (P_{11}, P_{22}), (P_{12}, P_{21}), (P_{12}, P_{22}), (P_{12}, P_{11}), (P_{21}, P_{11}), (P_{21}, P_{12}), (P_{21}, P_{22}), (P_{22}, P_{11}), (P_{22}, P_{12}), (P_{22}, P_{21})\}$—(pair of antennas currently being used)). Referring again to FIG. 2, if antenna pair ($P_{11}$, $P_{12}$) is currently being used and it is found that the signal at $P_{12}$ has fallen below the pre-defined threshold, then a switch is made from $P_{12}$ to $P_{21}$ so that the antenna pair to be used becomes ($P_{11}, P_{21}$) as indicated by the dashed line going from the antenna pair ($P_{11}, P_{12}$) to antenna pair ($P_{11}, P_{21}$). If, once again using antenna pair ($P_{11}, P_{12}$), it is found that $P_{11}$ has fallen below the pre-defined threshold, then a switch should be made from $P_{11}$ to $P_{12}$ but $P_{12}$ is already in use as one of the input signals of the currently used pair. The next highest available rank antenna would have to be selected and that would be $P_{21}$ so that the antenna pair to be used becomes ($P_{21}$, $P_{12}$) as indicated by the dashed and dotted line going from antenna pair ($P_{11}, P_{12}$) to antenna pair ($P_{21}, P_{12}$). The plurality of states indicates time progression and that the process of antenna pair selection is continual over the life of the signal transmissions. The dashed and dotted lines on FIG. 2 thus represent state movement from an antenna pair when the higher antenna of the pair in the current antenna pair set has fallen below the pre-defined threshold and needs to be switched. The dashed lines on FIG. 2 thus represent state movement from an antenna pair when the lower antenna of the pair in the current antenna pair set has fallen below the pre-defined threshold and needs to be switched.

Figure 3:
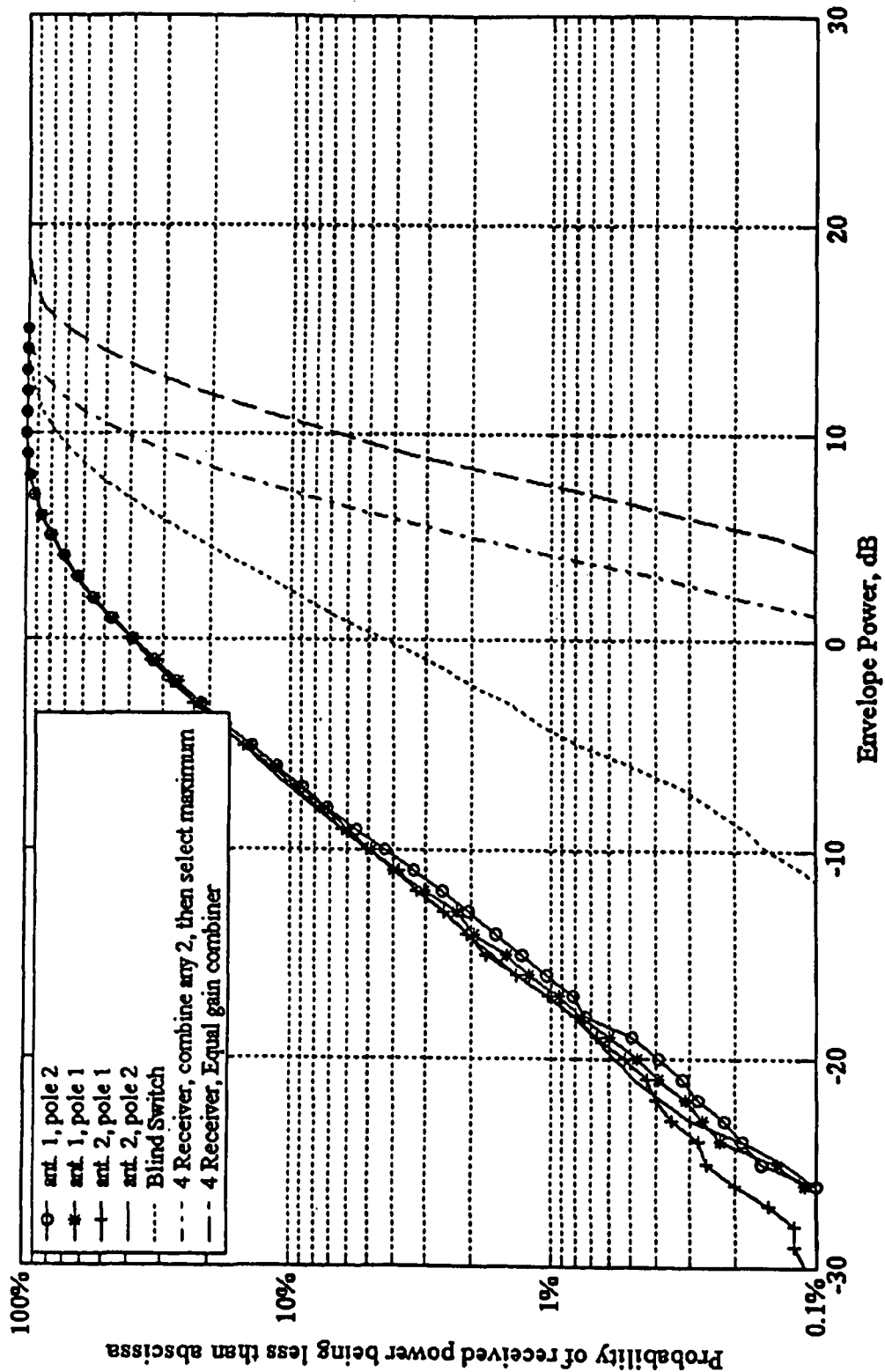
FIG. 3 shows the probability of received signal power being less than an abscissa envelope power in dB.
Figure 4:
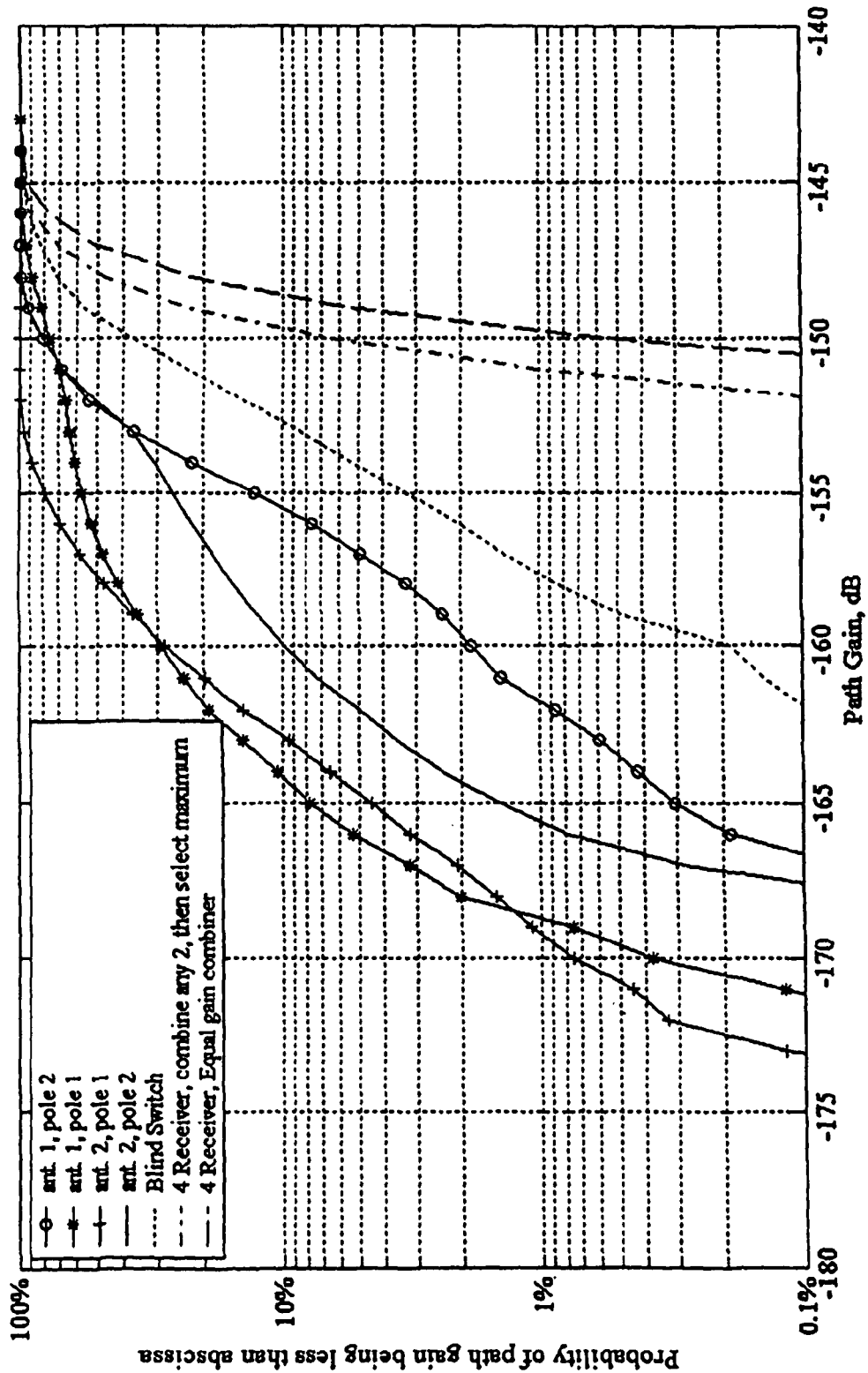
FIG. 4 shows the improvement in path loss.

In FIG. 3 the received signal envelope has a Rayleigh distribution. FIG. 3 shows the probability of received signal power being less than an abscissa envelope power in dB. FIG. 4 shows the path loss. FIGS. 3 and 4 provide simulation results for the statistical path gain improvement that arises from the use of the present invention. Inspection of these figures shows the improvement obtained using the present invention. In an ideal channel (such as cable or fiber), the plot in FIGS. 3 and 4 would be a vertical line in each case (on each figure) because the probability of receiving the signal is the same (or no variation in the received signal due to multipath). With the use of the present invention, the plot sharpens and becomes much more vertical, varying about 15 dB (indicating that the invention actually improves not only the median received power but it also improves the fade margin requirements for a given BER) range as indicated on FIG. 4.

Specifically, referring to FIG. 3, the maximal ratio combination of each of the possible antenna combinations is plotted. That is, antenna 1 with polarization A (ant 1, p1), antenna 1 with polarization B (ant 1, p2), antenna 2 with polarization A (ant 2, p1) and antenna 2 with polarization B (ant 2, p2) are plotted. Also plotted are the use of a blind switch, a four-receiver system that combines any two signals and then selects the maximum, and a four-receiver system that uses an equal gain combination. FIG. 4 plots the same combinations.

Figure 5:
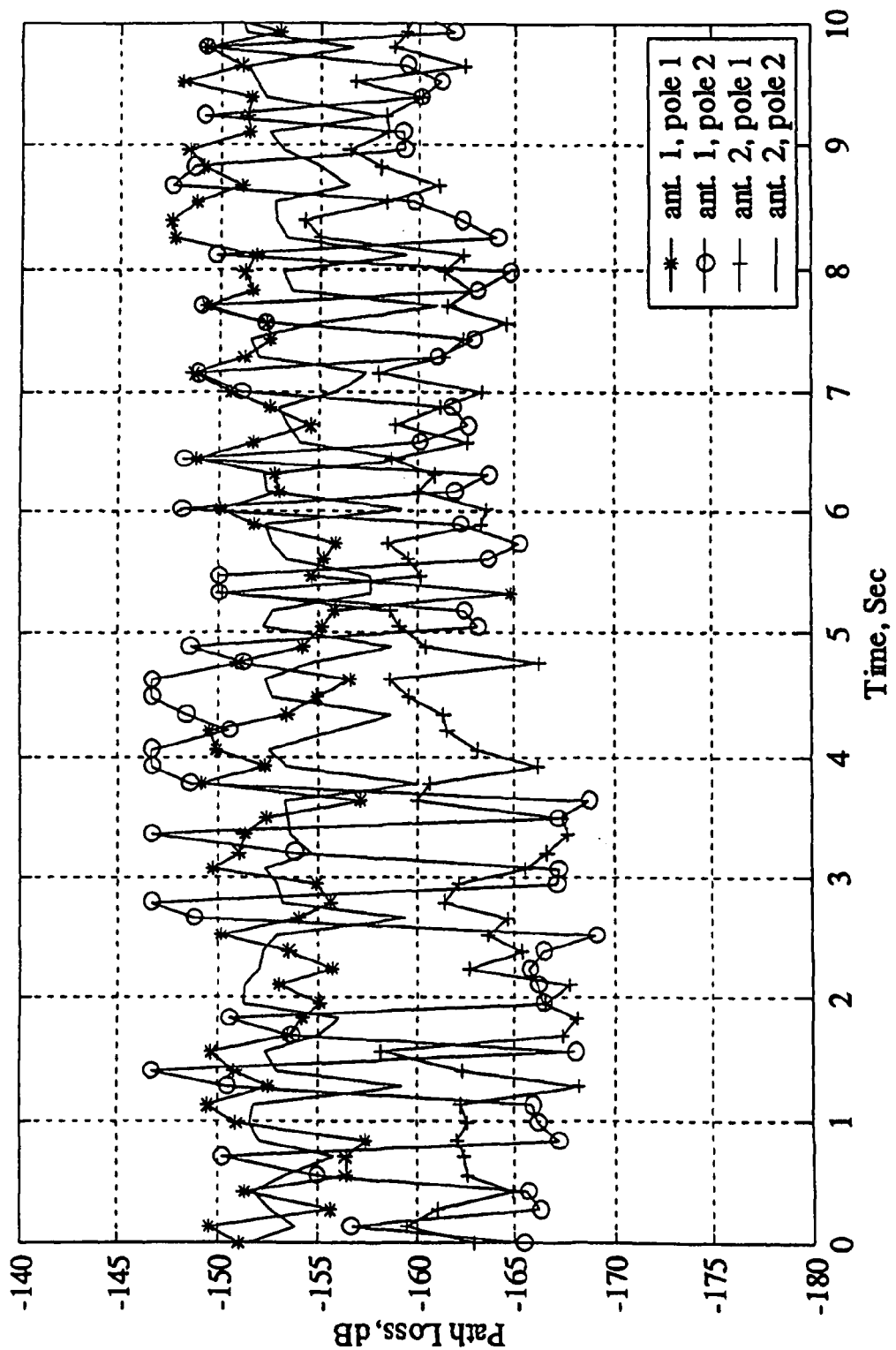
FIG. 5 shows the plot of average received power at the output of the receiver.

FIG. 5 shows the plot of average received power at the output of the receiver. Inspection of the figure shows that, for the two-input maximally combined case, the received power remains relatively constant over the time period. This is the topmost line in the graph.

It should be clear from the foregoing that the objectives of the invention have been met. While particular embodiments of the present invention have been described and illustrated, it should be noted that the invention is not limited thereto since modifications may be made by persons skilled in the art. The present application contemplates any and all modifications within the spirit and scope of the underlying invention disclosed and claimed herein.

What is claimed is:

1. An apparatus comprising:
   antennas $P_{11}$, $P_{12}$, $P_{21}$ and $P_{22}$;
   a controller;
   a first receiver;
   a second receiver;
   a first selector for selecting for said first receiver, pursuant to a first control signal from said controller, a first highest-ranked antenna of said antennas, not currently selected for said second receiver, and applying a signal of the first highest-ranked antenna to said first receiver;
   a second selector for selecting for said second receiver, pursuant to a second control signal from said controller, a second highest-ranked antenna of said antennas, not currently selected for said first receiver, and applying a signal of the second highest-ranked antenna to said second receiver; and
   a maximum ratio combiner responsive to an output signal from said first receiver, and to an output signal from said second receiver;
   where said controller develops said first control signal and said second control signal in response to said output signal of said first receiver and said output signal of said second receiver, and said control signals are restricted to refrain from concurrently changing the antennas selected by said first selector and said second selector, and when changing the antenna selected for said first receiver, to refrain from selecting the antenna selected for said second receiver;

where said controller is configured to re-rank the first highest-ranked antenna as a lower-ranked antenna and to re-develop the first control signal to select a highest-ranked, available antenna of said antennas, not currently selected for said second receiver, in response to a signal of the first highest-ranked antenna being associated with a first metric value below a predetermined threshold.

2. The apparatus of claim 1 where said antenna $P_{11}$ is situated at a first position to receive signals at a first polarization, said antenna $P_{12}$ is situated at said first position to receive signals at a second polarization, said antenna $P_{21}$ is situated at a third position to receive signals at said first polarization, and said antenna $P_{22}$ is situated at said fourth position to receive signals at said second polarization.

3. A method comprising:
coupling a first receiver path to a first antenna; and
coupling a second receiver path to a second antenna, the first and second antennas being highest-ranked antennas of a plurality of antennas, each antenna of the plurality of antennas having a distinct combination of antenna position and antenna polarization;
re-ranking the first antenna as a lower-ranked antenna and switching the coupling of the first receiver path from the first antenna to a highest-ranked, available antenna of the plurality of antennas, in response to a first signal received by the first receiver path being associated with a first metric value below a predetermined threshold;
and after the switching the coupling of the first receiver path, re-ranking the second antenna as a lower-ranked antenna and switching the coupling of the second receiver path from the second antenna of the plurality of antennas to a next highest-ranked available antenna of the plurality of antennas in response to a second signal received by the second receiver path being associated with a second metric value below the predetermined threshold.

4. The method of claim 3, wherein the first antenna is re-ranked as a lowest-ranked antenna.

5. The method of claim 3, further comprising:
generating the first metric value based on the predetermined threshold and the first signal;
and generating the second metric value based on the predetermined threshold and a second signal received by the second receiver path.

6. The method of claim 3, wherein the first metric value and the second metric value are generated further based on a first coefficient and a second coefficient, respectively.

7. The method of claim 3, further comprising:
maximum ratio combining the first signal and a second signal received by the second receiver path to generate a composite received signal.

8. The method of claim 3, wherein a plurality of signals received by the plurality of antennas are uncorrelated signals.

9. The method of claim 3, further comprising:
ranking the plurality of antennas by antenna number.

10. An apparatus comprising:
a first switch configured to couple a first receiver path to a first antenna;
a second switch configured to couple a second receiver path to a second antenna, the first and second antennas being highest-ranked antennas of a plurality of antennas, each antenna of the plurality of antennas having a distinct combination of antenna position and antenna polarization; and
a decision module configured to re-rank the first antenna as a lower-ranked antenna and to reconfigure the first switch to couple the first receiver path to a highest-ranked, available antenna of the plurality of antennas in response to a first signal received by the first receiver path being associated with a first metric value below a predetermined threshold, wherein the decision module is further configured to re-rank the second antenna as a lower-ranked antenna and to reconfigure the second switch to couple the second receiver path to a next highest-ranked, available antenna of the plurality of antennas after the switching the coupling of the first receiver path, in response to a second signal received by the second receiver path being associated with a second metric value below the predetermined threshold.

11. The apparatus of claim 10, wherein the first antenna is re-ranked as a lowest-ranked antenna.

12. The apparatus of claim 10, wherein the second antenna is re-ranked as a lowest-ranked antenna.

13. The apparatus of claim 10, wherein the decision module is further configured to generate the first metric value based on the predetermined threshold and the first signal and generate the second metric value based on the predetermined threshold and the second signal.

14. The apparatus of claim 10, wherein the decision module generates the first metric value and the second metric value further based on a first coefficient and a second coefficient, respectively.

15. The apparatus of claim 10, wherein the decision module is further configured to rank the plurality of antennas by antenna number.

16. The apparatus of claim 10, further comprising:
a maximum ratio combiner configured to generate a composite received signal based on the first signal and a second signal received by the second receiver path to generate a composite received signal.

17. The apparatus of claim 10, wherein a plurality of signals received by the plurality of antennas are uncorrelated signals.

18. The apparatus of claim 10, further comprising:
a plurality of antennas, wherein the number of antennas in the plurality of antennas is greater than the number of receiver paths in the apparatus.

* * * * *